United States Patent Office 2,863,760
Patented Dec. 9, 1958

2,863,760

RECOVERY OF PLATINUM FROM PLATINUM-ALUMINUM CATALYST

Kenneth D. Ashley and Malden W. Michael, Stamford, Conn., assignors to American Cyanamid Company, New York, N. Y., a corporation of Maine No Drawing. Application September 24, 1953
Serial No. 382,188

9 Claims. (Cl. 75—108)

This invention relates to the recovery of platinum from alumina-platinum-containing catalytic materials and, more particularly, pertains to the recovery of platinum from spent catalytic materials which have permanently lost a considerable part of their catalytic activity.

Platinum-containing catalysts are frequently used in the petroleum industry in hydroforming processes wherein petroleum heavy naphtha or gasoline fractions are treated to improve the anti-knock characteristics thereof. As an example of such processes, a straight run gasoline fraction may be subjected to temperatures of from about 500° F. to about 975° F. and pressures of from about atmospheric to about 1000 pounds per square inch and contacted with the selected platinum-containing catalyst in the presence of hydrogen whereby gasoline having greatly improved anti-knock characteristics is obtained.

After a period of operating service during which time the catalyst gradually loses its effective catalytic activity, it is necessary to reactivate the catalyst to restore its characteristics and this is usually accomplished by passing air or other oxygen-containing gases through the catalyst in order to burn off the interfering carbonaceous materials deposited thereon during the hydroforming process. A particularly suitable manner of effecting such regeneration comprises subjecting the catalyst to temperatures of from about 900° F. to about 1050° F., starting with a gas containing as low as about 2% oxygen gradually increasing the oxygen concentration so that at the end of the regeneration period, pure air or oxygen is being passed over the catalyst. Following the regeneration, the reactivated catalyst is then ready to be re-used in the hydroforming process.

However, after a period of time covering a considerable number of service and regeneration cycles, the activity of the catalyst becomes permanently impaired to an uneconomical extent and further regeneration is ineffectual or impractical. The catalyst is then considered "spent" and is removed from the operation and is replaced with fresh catalyst.

In the case of most other catalytic materials, such as those consisting entirely of silica and alumina, or silica, magnesia and alumina, the spent catalyst would usually be disposed of as cheaply and as economically as possible. However, in the case of those catalysts containing platinum, even in concentrations as low as 0.1% or less by weight, and particularly those having platinum concentrations up to 0.7% or more by weight, the value of such platinum is enormous and represents a large capital investment which must be recovered and re-utilized.

Furthermore, not only must the platinum be recovered from the catalytic materials, but such recovers must be made as efficiently as possible and as close to 100% as practical, inasmuch as even a 1% loss would represent a large dollar-wise waste.

It is therefore a principal purpose of the present invention to provide an improved process of recovering platinum from alumina-platinum-containing materials.

It is a further principal purpose of the present invention to provide a platinum recovery process capable of recovering close to 100% of the platinum.

Hitherto, the methods commonly employed in the industry, although acceptable thereto, have left much to be desired. For example, in one method now in use the spent catalytic material has been completely dissolved in a aqua regia (a mixture of three to four parts hydrochloric acid and one part of nitric acid). However, such a method took substantially everything into solution whereby a complicated, time-consuming and expensive separation of the platinum from the other dissolved materials was required. Another method has involved the use of nitric acid alone but such a method has proved wholly unsatisfactory. In still another method, chlorine gas or hydrochloric acid alone has been used but difficulties have been encountered and low yields have been derived due to the failure of such reactants to completely dissolve the alumina.

We have found that if the alumina-platinum-containing catalyst is treated with a stoichiometric excess of sulfuric acid, the alumina goes into solution and the metallic platinum, which is in a very finely divided state, remains in suspension. A flocculating agent may then be added to said solution to flocculate the platinum so that it may be separated from the solution and recovered. We have further found that this solution contains very small concentrations of soluble platinum, perhaps on the order of from about 0.2 to about 25 parts per million, which may be precipitated by the passage of hydrogen sulfide through the solution and subsequently separated and recovered, whereby the recovery of the platinum is made even more complete and approaches a value of 100%.

The stoichiometric excess of sulfuric acid used in the digestion of the catalyst may be very small, say, on the order of about 5% or even less and may be as high as desired, depending on the nature of the catalytic material used and the economic factors involved. For the purposes of the present invention, however, it has been found that an excess of about 5–14% of a 20–50% sulfuric acid is preferable. The concentration of the sulfuric acid need not necessarily be in the range from 20 to 50% but may be lower or higher, as desired or required, depending on the factors of the particular situation and it is to be repeated that such a value is merely indicative of a preferred range.

The temperature and duration of the digestion are interdependent factors and may be varied accordingly, depending upon their individual values and upon the degree of excess and the concentration of the sulfuric acid used. For example, digestion periods of but a few hours have been found successful as well as digestions of up to twenty hours or more. Temperatures of from about 80° C. up to about 110° C. or more have been found preferable.

Following the sulfuric acid digestion, the solution may be diluted so as to form approximately a 14% aluminum sulfate solution to facilitate handling during the subsequent steps of flocculation and separation of the platinum. Higher or lower concentrations of the solution may be prepared or the dilution omitted entirely, as desired, depending on the particular circumstances involved. For example, an undiluted solution may be filtered, if hot and under pressure, but such has been found to be less desirable economically.

Substantially any flocculating agent capable of aggregating the finely-divided platinum may be added to the aluminum sulfate solution in order to condition and prepare the platinum for separation. Such conditioning or flocculating agents as cellulosic materials, preferably in fibrous form, or "Cyron Size" (a reaction product of a higher fatty acid such as stearic acid, a polyethylene polyamine, such as triethylene tetramine, tetraethylene pentamine or the like and acetic acid), of "Flocculating Agent 2026" (a reaction product of cottonseed foots and diethylenetriamine) may be employed.

The aluminum sulfate solution contains on the order of from about 0.2 part per million up to perhaps 25 or more parts per million of soluble platinum, perhaps in the form of incompletely reduced platinum chloride, and it is desirable economically to recover this amount. Recovery may be effected by bubbling in hydrogen sulfide to precipitate the soluble platinum as platinum sulfide and then separating and recovering the same.

If desired, the hydrogen sulfide may be bubbled through the solution containing the metallic platinum, followed by the addition of the flocculating agent, whereby filtration yields a mixture of platinum and platinum sulfide which may be separated at a later time. However, if desired, the metallic platinum may be flocculated first and may be separated and recovered by filtering and then the platinum sulfide may be precipitated by the passage of the hydrogen sulfide through the filtrate whereby separation of the platinum and the platinum sulfide is obviated.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

Example 1

A catalyst containing 0.6% platinum on alumina was used for 5 months in hydroforming a straight run naphtha to produce a gasoline of around 90 research octane rating. At the end of that time, the catalyst had lost a considerable part of its activity. The catalyst was removed from the unit and was treated in order to recover the platinum. Twenty pounds of spent catalyst was digested with 130 pounds of 50% sulfuric acid for 10 hours at 85–93° C. with rapid agitation in a glass-lined vessel. The alumina was dissolved, leaving the platinum in suspension. The solution was diluted with enough water to produce a 14% $Al_2(SO_4)_3$ solution. Then a flocculant comprising 0.13 pound of Cyron Size was added. The flocculated platinum settled to the bottom of the digestion vessel. The supernatant liquid was drawn off, and the platinum was filtered on a suitable filtering medium, preferably using diatomaceous earth as a filter aid.

The recovered platinum was pure enough for conversion to chloroplatinic acid for reuse in a new batch of catalyst; practically all of the metallic impurities picked up by the catalyst in use were dissolved in the sulfuric acid. The diluted alum solution contained only about 2–4 p. p. m. of platinum. This was recovered by bubbling in some hydrogen sulfide, flocculating the platinum sulfide, and filtering.

Example 2

A catalyst containing 0.25% platinum on alumina was used for 5 months in hydroforming a straight-run naphtha to produce a gasoline of around 90 octane rating. At the end of this time, the catalyst had lost a considerable part of its activity. The catalyst was removed from the unit and was treated to recover the platinum. Twenty pounds of spent catalyst was digested with 140 pounds of 50% sulfuric acid for 10 hours at 85–93° C. with rapid agitation in a glass-lined vessel. The aluminum was dissolved, leaving the platinum in suspension. The solution was diluted with enough water to produce a 14% $Al_2(SO_4)_3$ solution. Then a flocculant comprising 0.13 pounds of Cyron Size was added. The flocculated platinum settled to the bottom of the pot. The supernatant liquid was drawn off, and the platinum was filtered on a suitable filtering medium, using diatomaceous earth as a filter aid.

The recovered platinum was pure enough for conversion to chloroplatinic acid for reuse in a new batch of catalyst; practically all of the metallic impurities picked up by the catalyst in use were dissolved in the sulfuric acid.

The diluted alum contained only about 6 p. p. m. of platinum. This was recovered by bubbling in some hydrogen sulfide, flocculating the platinum sulfide, and filtering.

Example 3

A catalyst containing 0.6% platinum on alumina was used for 5 months in hydroforming a straight-run naphtha to produce a gasoline of around 90 research octane rating. At the end of this time, the catalyst had lost a considerable part of its activity. The catalyst was removed from the unit and was treated to recover the platinum. Twenty-five pounds of spent catalyst was digested with 160 pounds of 50% sulfuric acid for 9 hours at 90–95° C. with rapid agitation in a glass-lined vessel. The aluminum was dissolved, leaving the platinum in suspension. The solution was diluted with enough water to produce a 14% $Al_2(SO_4)_3$ solution. Then a flocculant comprising 0.25 pound of Cyron Size was added. The flocculated platinum settled to the bottom of the pot. The supernatant liquid was drawn off, and the platinum was filtered on a suitable filtering medium, using diatomaceous earth as a filter aid.

The recovered platinum was pure enough for conversion to chloroplatinic acid for reuse in a new batch of catalyst; practically all of the metallic impurities picked up by the catalyst in use were dissolved in the sulfuric acid.

The diluted alum contained only about 8 p. p. m. of platinum. This was recovered by bubbling in some hydrogen sulfide, flocculating the platinum sulfide, and filtering.

Example 4

100 grams of spent hydroforming catalyst containing 0.6% platinum was digested in approximately 825 grams of 40% sulfuric acid for approximately 8 hours within a temperature range of about 100° C. to about 105° C. The solution was then diluted with water until it contained a concentration of about 14% aluminum sulfate and the metallic platinum which had remained in suspension was flocculated by the addition of about 0.625 gram of Cyron Size in a 0.5% solution. The flocculated platinum was then filtered, using cellulose as a filtering aid. After ignition which burned off all of the cellulose, the residue contained approximately 97.6% platinum which was considered pure enough for conversion to chloroplatinic acid for reuse in manufacturing a new batch of catalyst.

Example 5

100 grams of a spent platforming catalyst containing 0.6% platinum was digested for a period of approximately 18 hours at a temperature of approximately 95–100° C. in 1100 grams of 30% sulfuric acid. The alumina was dissolved and the metallic platinum which was in a very finely divided state remained in suspension. The solution was then diluted to contain approximately 14% aluminum sulfate and the platinum was flocculated by the addition of approximately 0.625 gram of Cyron Size in a 0.5% solution. The flocculated platinum was then filtered and washed, using cellulose as a filtering aid. After burning off the cellulosic material it was established that the residue contained 97% platinum.

Example 6

The filtrate from Example 5 was then treated in order to recover any soluble platinum therein by bubbling hydrogen sulfide therethrough in order to precipitate the platinum in the form of platinum sulfide. The precipitated platinum sulfide was then flocculated by the addition of a flocculating agent and then filtered and washed. Additional platinum was recovered and raised the total recovery of platinum to 99.5%.

Example 7

100 grams of a partially spent platforming catalyst containing 0.3% platinum was digested with rapid agitation in a glass-lined vessel for a period of 8 hours at a temperature of approximately 105–110° C. in 658 grams of 50% sulfuric acid. The alumina was completely dissolved and the platinum remained in suspension in a very finely divided form. The solution was then diluted to contain approximately a 14% concentration of aluminum sulfate. Hydrogen sulfide was then bubbled through the solution in order to precipitate any soluble platinum in the solution as platinum sulfide. A flocculating agent comprising 1.5 grams of Flocculating Agent 2026 was then added and the flocculated metallic platinum and platinum sulfide was then filtered off, using cellulose as a filter aid. The metallic platinum and the platinum sulfide were then separated. The ultimate recovery of platinum by this process was determined to be on the order of 99%.

Although we have described but a few specific examples of our invention, we consider the case not to be limited thereby to the specific substances mentioned therein, but to include various other equivalent compounds of similar constitution as set forth in the claims appended hereto. It is understood that any suitable changes or variations may be made without departing from the spirit or scope of the inventive concept.

We claim:

1. A method of recovering platinum from alumina-platinum-containing catalytic material which comprises digesting said catalytic material with a stoichiometric excess of sulfuric acid whereby the alumina goes into solution and platinum remains in suspension, passing hydrogen sulfide through said solution to precipitate any soluble platinum therein, flocculating the platinum in suspension and the precipitated platinum sulfide, and separating the flocculated platinum-containing materials from the solution.

2. A method of recovering platinum from alumina-platinum-containing catalytic material which comprises digesting said catalytic material with a stoichiometric excess of sulfuric acid whereby the alumina goes into solution and platinum remains in suspension, flocculating the platinum, separating the flocculated platinum from the solution, passing hydrogen sulfide through the solution from which the flocculated platinum has been removed to precipitate any soluble platinum therein, and separating the precipitated platinum-containing materials from said last-mentioned solution.

3. A method of recovering platinum from alumina-platinum-containing catalytic material which comprises digesting said catalytic material with a 5 to 15% stoichiometric excess of 20 to 50% sulfuric acid whereby the alumina goes into solution and platinum remains in suspension, passing hydrogen sulfide through said solution to precipitate any soluble platinum therein, flocculating the platinum in suspension and the precipitated platinum sulfide, and separating the flocculated platinum-containing materials from the solution.

4. A method of recovering platinum from alumina-platinum-containing catalytic material which comprises digesting said catalytic material with a 5 to 15% stoichiometric excess of 20 to 50% sulfuric acid whereby the alumina goes into solution and platinum remains in suspension, flocculating the platinum, separating the flocculated platinum from the solution, passing hydrogen sulfide through the solution from which the flocculated platinum has been removed to precipitate any soluble platinum therein, and separating the precipitated platinum-containing materials from said last-mentioned solution.

5. A method of recovering platinum from alumina-platinum-containing catalytic material which comprises digesting said catalytic material with a stoichiometric excess of sulfuric acid whereby the alumina goes into solution and platinum remains in suspension, adding a reaction product of a higher fatty acid, a polyethylene polyamine and acetic acid to flocculate the platinum, and separating the flocculated platinum from the solution.

6. A method of recovering platinum from alumina-platinum-containing catalytic material which comprises digesting said catalytic material with a stoichiometric excess of sulfuric acid whereby the alumina goes into solution and platinum remains in suspension, adding a fibrous cellulosic material to flocculate the platinum, and separating the flocculated platinum from the solution.

7. In a method of recovering platinum from alumina-platinum-containing catalytic material which comprises digesting said catalytic material with sulfuric acid whereby the alumina goes into solution and platinum remains in suspension, flocculating the platinum, and separating the flocculated platinum from the solution, the improvement which comprises precipitating any soluble platinum remaining in solution after the digestion of the catalytic material as platinum sulfide by the use of hydrogen sulfide.

8. A method of recovering platinum from alumina-platinum catalyst which comprises digesting said catalyst with aqueous sulfuric acid and thereby forming a suspension of finely divided metallic platinum in an aqueous alumina sulfate solution, adding a flocculating agent to said suspension and thereby flocculating the finely divided platinum particles suspended therein and separating the flocculated platinum from the solution.

9. A method of recovering platinum from an alumina-platinum catalyst which comprises digesting said catalyst with stoichiometric excesses of aqueous sulfuric acid and thereby forming a suspension of finely divided metallic platinum in an aqueous aluminum sulfate solution, adding a flocculating agent to said suspension and thereby flocculating the finely divided platinum particles suspended therein and separating the flocculating platinum from the solution.

References Cited in the file of this patent

UNITED STATES PATENTS 191,160     Lennig _____ May 22, 1877

OTHER REFERENCES

Mellor: Comprehensive Treatise on Inorganic and Theoretical Chemistry, vol. 16, pages 156 and 157.